(12) United States Patent
Mizuno et al.

(10) Patent No.: US 8,229,239 B2
(45) Date of Patent: Jul. 24, 2012

(54) IMAGE PROCESSOR

(75) Inventors: Yusuke Mizuno, Osaka (JP); Takashi Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 804 days.

(21) Appl. No.: 12/402,916

(22) Filed: Mar. 12, 2009

(65) Prior Publication Data

US 2009/0245674 A1 Oct. 1, 2009

(30) Foreign Application Priority Data

Mar. 27, 2008 (JP) ................................ 2008-084156

(51) Int. Cl.
*G06K 9/00* (2006.01)
*G06K 9/36* (2006.01)
*G06K 9/46* (2006.01)

(52) U.S. Cl. ......... 382/248; 382/166; 382/233; 382/250

(58) Field of Classification Search .................. 382/166, 382/233, 248, 250
See application file for complete search history.

(56) References Cited

U.S. PATENT DOCUMENTS

| | | | | |
|---|---|---|---|---|
| 3,812,491 A | * | 5/1974 | Barraclough et al. | ......... 345/614 |
| 5,335,019 A | * | 8/1994 | Herz et al. | ................... 348/607 |
| 6,185,254 B1 | | 2/2001 | Ogata | |
| 6,477,276 B1 | * | 11/2002 | Inoue et al. | ................... 382/232 |
| 6,724,817 B1 | * | 4/2004 | Simpson et al. | ......... 375/240.07 |
| 7,209,064 B1 | * | 4/2007 | Gaboriau et al. | ............. 341/152 |
| 2003/0147547 A1 | * | 8/2003 | Lin et al. | ........................ 382/100 |
| 2004/0151341 A1 | * | 8/2004 | Fujikawa et al. | ............. 382/100 |
| 2006/0171460 A1 | * | 8/2006 | Masuda et al. | ........... 375/240.03 |
| 2007/0222656 A1 | * | 9/2007 | Melanson | ..................... 341/155 |
| 2009/0086814 A1 | * | 4/2009 | Leontaris et al. | ........ 375/240.02 |

FOREIGN PATENT DOCUMENTS

| | | |
|---|---|---|
| JP | 6-77842 | 3/1994 |
| JP | 10-191391 | 7/1998 |

OTHER PUBLICATIONS

"HD Photo-Photographic Still Image File Format", Nov. 7, 2006, 140 pages.
"Coding of Still Pictures-JBIG JPEG", ISO/IEC JTC 1/SC 29/WG 1 N4392, ISO/IEC CD 29199-2, Dec. 19, 2007, 151 pages.

* cited by examiner

*Primary Examiner* — Yubin Hung
(74) *Attorney, Agent, or Firm* — Oblon, Spivak, McClelland, Maier & Neustadt, L.L.P.

(57) ABSTRACT

An image processor includes a quantization unit receiving first data before quantization and outputting second data after quantization, a prediction unit obtaining a difference value between the second data and third data being prediction data and outputting the difference value as fourth data, and an encoding unit encoding the fourth data. The quantization unit includes a first processing unit dividing the first data by a quantization coefficient, so as to obtain fifth data including a fraction as a result of division and a second processing unit rounding up or rounding off the fraction such that a value of the fourth data becomes smaller based on comparison between the third data and the fifth data, so as to obtain the second data.

5 Claims, 8 Drawing Sheets

IMAGE PROCESSOR

CROSS-REFERENCE TO RELATED APPLICATIONS

This application claims priority to Japanese Patent Application No. 2008-084156. The entire disclosure of Japanese Patent Application No. 2008-084156 is hereby incorporated herein by reference.

BACKGROUND OF THE INVENTION

1. Field of the Invention

The present invention relates to an image processor, and more particularly, to an encoder in a predictive coding system.

2. Description of the Background Art

FIG. 13 is a block diagram showing a configuration of an encoder 101 in a predictive coding system. The encoder 101 includes a quantization unit 102, a prediction unit 103, and an encoding unit 104. Data D100 is inputted from a preceding processing block (not shown) to the quantization unit 102. The quantization unit 102 quantizes the data D100, so as to output data D101. The data D101 is inputted from the quantization unit 102 to the prediction unit 103. Meanwhile, data which was previously processed has been inputted to the prediction unit 103 as prediction data D102. The prediction unit 103 outputs a difference value between the data D101 and the prediction data D102 as data D103. The data D103 is inputted from the prediction unit 103 to the encoding unit 104. The encoding unit 104 performs entropy coding on the data D103, so as to output coded data D104.

Microsoft Corporation has recently proposed HD Photo (or JPEG XR) as a still image file format that offers higher image quality than JPEG while requiring more simple circuit configuration and computation than JPEG 2000.

FIG. 14 is a block diagram showing a configuration of an encoder 201 for HD Photo. The encoder 201 includes a color conversion unit 202, a pre-filter 203, a frequency transform unit 204, a quantization unit 205, a prediction unit 206, and an encoding unit 207.

A pixel signal D200 of RGB color space is inputted from an imaging element, such as a CCD or CMOS image sensor, to the color conversion unit 202. The color conversion unit 202 converts the pixel signal D200 into a pixel signal D201 of, for example, YUV color space, and outputs the same. The pixel signal D201 is inputted from the color conversion unit 202 to the pre-filter 203. The pre-filter 203 performs prefiltering to reduce block artifacts on the pixel signal D201, and outputs a pixel signal D202. The pixel signal D202 is inputted from the pre-filter 203 to the frequency transform unit 204. The frequency transform unit 204 performs predetermined frequency transform (PCT: HD Photo Core Transform) on the pixel signal D202, and outputs data D203 after frequency transform. In HD Photo, the data D203 includes highpass, lowpass, and direct current components.

The data D203 is inputted from the frequency transform unit 204 to the quantization unit 205. The quantization unit 205 quantizes the data D203, so as to output data D204. The data D204 is inputted from the quantization unit 205 to the prediction unit 206. Meanwhile, data which was previously processed has been inputted to the prediction unit 206 as prediction data. The prediction unit 206 outputs a difference value between the data D204 and the prediction data as data D205. The data D205 is inputted from the prediction unit 206 to the encoding unit 207. The encoding unit 207 performs entropy coding on the data D205, so as to output coded data D206.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.orjp/sc29/open/29view/29n9026t.doc>.

In the encoders 101 and 201 shown in FIGS. 13 and 14, the values of data after prediction (data D103 and D205) inputted to the encoding units 104 and 207 are preferably as small as possible, in order that an amount of code of the coded data D104 and D206 outputted from the encoding units 104 and 207 is reduced.

SUMMARY OF THE INVENTION

It is an object of the present invention to provide an image processor that reduces an amount of code of coded data, by making a value of data after prediction inputted to an encoding unit small.

According to an aspect of the present invention, an image processor includes a quantization unit receiving first data before quantization and outputting second data after quantization, a prediction unit obtaining a difference value between the second data and third data being prediction data and outputting the difference value as fourth data, and an encoding unit encoding the fourth data. The quantization unit includes a first processing unit dividing the first data by a quantization coefficient, so as to obtain fifth data including a fraction as a result of division and a second processing unit rounding up or rounding off the fraction such that a value of the fourth data becomes smaller based on comparison between the third data and the fifth data, so as to obtain the second data.

The second processing unit rounds up or rounds off the fraction such that the value of the fourth data becomes smaller based on comparison between the third and the fifth data. Consequently, since the value of the data to be encoded by the encoding unit becomes smaller, reduction of an amount of code of the data after encoding is achieved.

Preferably, in the image processor, the encoding unit includes a third processing unit splitting the fourth data into a first partial data in a first digit range on an upper side and a second partial data in a second digit range on a lower side, and a fourth processing unit encoding only the first partial data between the first and second partial data. The fraction is data of a specific digit and a lower digit in a third digit range equivalent to the second digit range in the fifth data.

Since the value of the first partial data to be encoded by the fourth processing unit becomes smaller, reduction of an amount of code of the data after encoding is achieved. Furthermore, only the first partial data on the upper side is encoded, rather than the whole fourth data, and effect of reduction of an amount of code is achieved by encoding this first partial data on the upper side. Thus effect of reduction of an amount of code is more prominent than when the whole fourth data is encoded.

Preferably in the image processor, the specific digit is set arbitrarily within a range of the most significant and lower digits in the third digit range.

One can set a specific digit for defining the fraction of the fifth data at an arbitrary digit within the range of the most significant and a lower digit in the third digit range. Setting the specific digit at an upper side enhances the effect of reduction of an amount of code, while setting at a lower side improves image quality. This allows setting in accordance with preferences of a user.

Preferably in the image processor, the first digit range is a Normal Bit in HD Photo, and the second digit range is a Flex Bit in HD Photo.

Reduction of an amount of code of the data after entropy coding is achieved with respect to a Normal Bit on which entropy coding is performed in HD Photo.

Thus an amount of code of coded data is reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
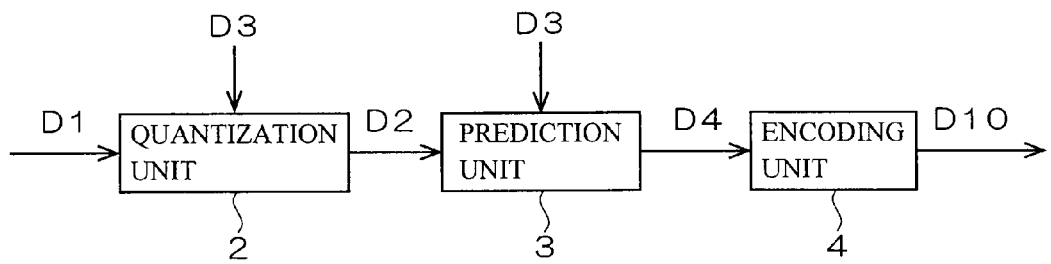
FIG. 1 is a block diagram showing a configuration of an image processor according to a first preferred embodiment of the present invention.

Preferred embodiments of the present invention are described in detail below referring to the drawings. It should be noted that identical reference numerals throughout the drawings indicate identical or equivalent elements.

First Preferred Embodiment

FIG. 1 is a block diagram showing a configuration of an image processor 1A according to a first preferred embodiment of the present invention. The image processor 1A is applicable not only to an encoder in HD Photo, but also to a general encoder in a predictive coding system.

The image processor 1A includes a quantization unit 2, a prediction unit 3, and an encoding unit 4. Data D1 before quantization is inputted from a preceding processing block (not shown. a frequency transform unit, for example) to the quantization unit 2. The quantization unit 2 outputs data D2 after quantization. The data D2 is inputted from the quantization unit 2 to the prediction unit 3. Meanwhile, data which was previously processed (data in the former process, for example) has been inputted to the prediction unit 3 as prediction data D3. The prediction unit 3 outputs a difference value between the data D2 and the prediction data D3 as data D4. Depending on a condition, the prediction unit 3 does not perform prediction. In such a case, data having a value "0" is employed as the prediction data D3. The data D4 is inputted from the prediction unit 3 to the encoding unit 4. The encoding unit 4 performs entropy coding on the data D4, so as to output coded data D10.

Figure 2:
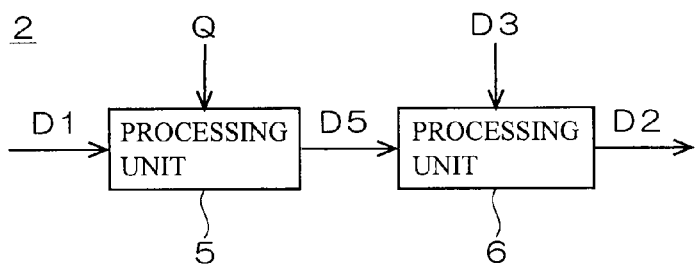
FIG. 2 is a block diagram showing a configuration of a quantization unit shown in FIG. 1.

FIG. 2 is a block diagram showing a configuration of the quantization unit 2 in FIG. 1. The quantization unit 2 includes processing units 5 and 6. The data D1 is inputted to the processing unit 5. The processing unit 5 divides the data D1 by a quantization coefficient Q, so as to output data D5 including a fraction as a result of division. The data D5 is inputted from the processing unit 5 to the processing unit 6. Meanwhile, the prediction data D3 has been inputted to the processing unit 6. The processing unit 6 compares the data D5 with the data D3, and based on the comparison, rounds up or rounds off the fraction of data D5 such that the value of the data D4 becomes smaller, so as to output the data D2.

Figure 3:
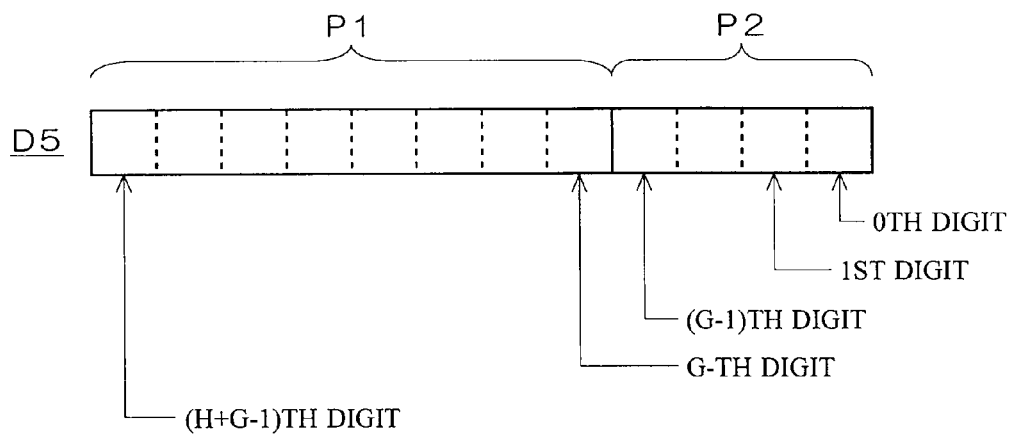
FIG. 3 shows data.

FIG. 3 shows the data D5. The data D5 has an integer part P1 and a fractional part P2. Let the bit width of the integer part P1 be H, the bit width of the fractional part P2 be G, and the least significant digit of the fractional part P2 be the 0th digit. Then the most significant digit of the fractional part P2 is the (G−1)th digit, the least significant digit of the integer part P1 is the G-th digit, and the most significant digit of the integer part P1 is the (H+G−1)th digit. For example, when the bit width H is 8 bits and the bit width G is 4 bits, the most significant digit of the fractional part P2 is the 3rd digit, the least significant digit of the integer part P1 is the 4th digit, and the most significant digit of the integer part P1 is the 11th digit.

FIGS. 4A to 4F illustrate processing of the processing units 5 and 6 shown in FIG. 2. In FIGS. 4A to 4F, it is assumed that the bit width of the data D1 is 8 bits and the value of the quantization coefficient Q is "8", by way of example.

Figure 4A:
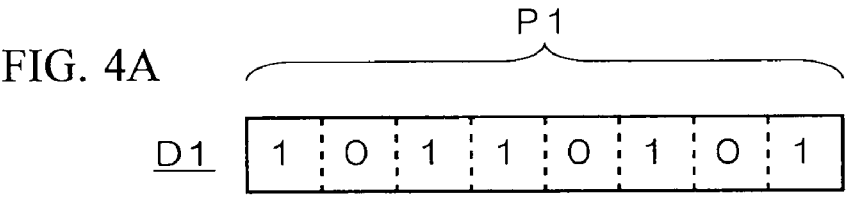
FIGS. 4A to 4F illustrate processing of processing units shown in FIG. 2.

As shown in FIG. 4A, the data D1 having a value, for example, "10110101" is inputted to the processing unit 5.

Figure 4B:
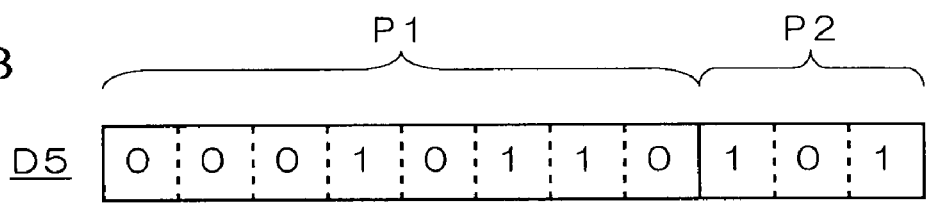

The processing unit 5 divides the data D1 by "8", so as to output the data D5 including a fraction as a result of division. Specifically, as shown in FIG. 4B, the data D1 is shifted 3 bit positions to the right, and the data D5 including the integer part P1 having a value "00010110" and the fractional part P2 having a value "101" is outputted. The fractional part P2 is the fraction in the data D5. The data D5 is inputted to the processing unit 6.

The prediction data D3 has been inputted to the processing unit 6.

Figure 4C:
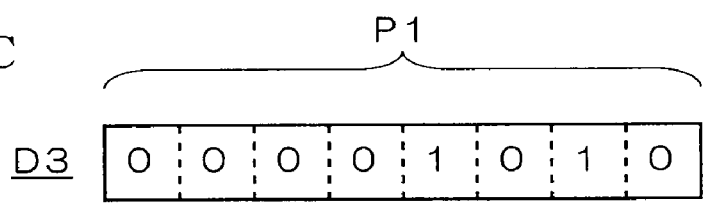
Figure 4D:
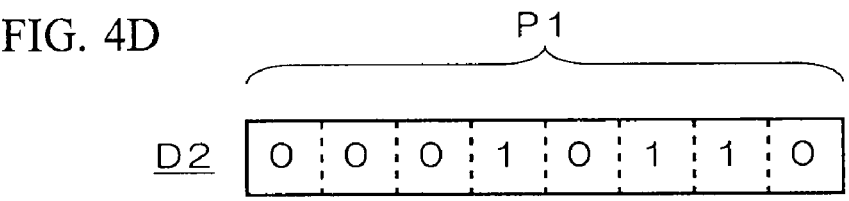

Here, it is assumed as a first case that the prediction data D3 having a value, for example, "00001010" has been inputted to the processing unit 6, as shown in FIG. 4C. The processing unit 6 compares the data D5 with the data D3. In this first case, the data D5 is larger than the data D3. In such a case, the processing unit 6 outputs the D2 data having a value "00010110" obtained by rounding off the fractional part P2 of the data D5, as shown in FIG. 4D. When the data D5 is larger than the data D3, the value of the data D2 approaches the value of the data D3 by rounding off the fractional part P2 of the data D5. Consequently, referring to FIG. 1, since the data D4, which is a difference value between the data D2 and the data D3, becomes smaller, an amount of code of the coded data D10 is reduced.

Figure 4E:
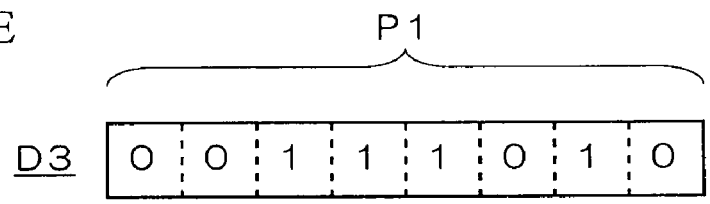
Figure 4F:
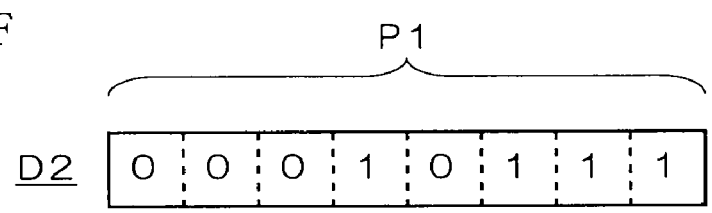

In contrast, it is assumed as a second case that the prediction data D3 having a value, for example, "00111010" has been inputted to the processing unit 6, as shown in FIG. 4E. The processing unit 6 compares the data D5 with the data D3. In this second case, the data D5 is smaller than the data D3. In such a case, the processing unit 6 outputs the data D2 having a value "00010111" obtained by rounding up the fractional part P2 of the data D5, as shown in FIG. 4F. When the data D5 is smaller than the data D3, the value of the data D2 approaches the value of the data D3 by rounding up the fractional part P2 of the data D5. Consequently, referring to FIG. 1, since the data D4, which is a difference value between the data D2 and the data D3, becomes smaller, an amount of code of the coded data D10 is reduced.

As described above, according to the image processor 1A of the first preferred embodiment, the processing unit 6 rounds up or rounds off the fraction included in the data D5 (fractional part P2) such that the value of the data D4 becomes smaller, based on the comparison between the data D3 and D5. Consequently, since the value of the data D4 to be encoded by the encoding unit 4 becomes smaller, reduction of an amount of code of the coded data D10 is achieved.

Second Preferred Embodiment

Figure 5:
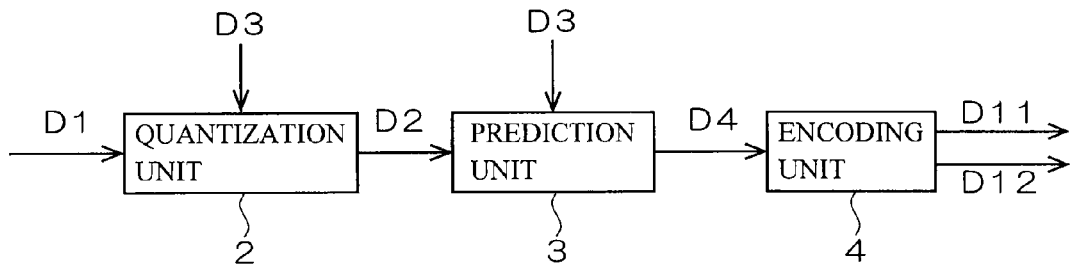
FIG. 5 is a block diagram showing a configuration of an image processor according to a second preferred embodiment of the present invention.

FIG. 5 is a block diagram showing a configuration of an image processor 1B according to a second preferred embodiment of the present invention. The image processor 1B is applicable to an encoder whose target data of encoding includes a part to be encoded and a part not to be encoded, such as an encoder in HD Photo, for example. Coded data D11 and data D12 that is not encoded are outputted from the encoding unit 4. The rest of the configuration is the same as in FIG. 1.

Figure 6:
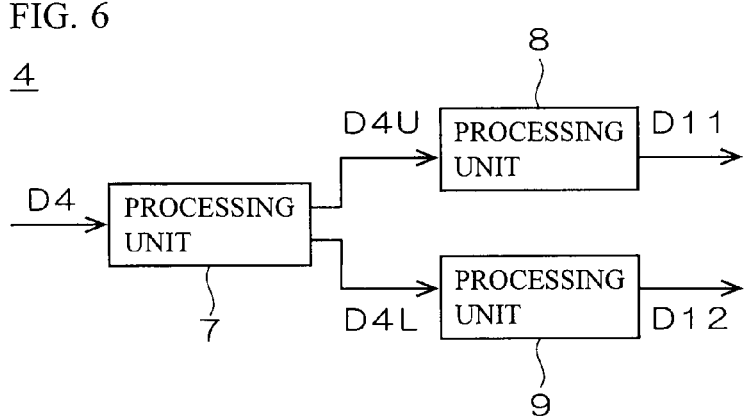
FIG. 6 is a block diagram showing a configuration of an encoding unit shown in FIG. 5.

FIG. 6 is a block diagram showing a configuration of the encoding unit 4 shown in FIG. 5. The encoding unit 4 includes processing units 7 to 9. The data D4 is inputted from the prediction unit 3 shown in FIG. 5 to the processing unit 7. The processing unit 7 splits the data D4 to output partial data D4U and D4L. The partial data D4U is inputted from the processing unit 7 to the processing unit 8. The processing unit 8 performs entropy coding on the partial data D4U, so as to output the coded data D11. The partial data D4L is inputted from the processing unit 7 to the processing unit 9. The processing unit 9 generates data D12 to be outputted based on the data D4L. For example, the processing unit 9 rounds off lower (i.e. less significant) bits defined as Trim Bits in the data D4L, so as to generate the data D12 to be outputted.

Figure 7:
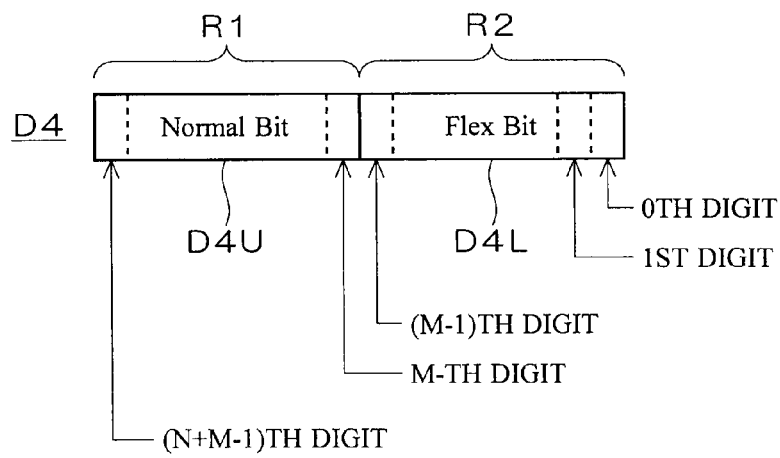
FIG. 7 shows data.

FIG. 7 shows the data D4. The processing unit 7 splits the data D4 into the partial data D4U in a digit range R1 on the upper (i.e. more significant) side and the partial data D4L in a digit range R2 on the lower side. The digit ranges R1 and R2 are respectively equivalent to Normal Bits and Flex Bits in HD Photo. Let the bit width of the digit range R1 be N, the bit width of the digit range R2 (Model Bits) be M, and the least significant digit of the digit range R2 be the 0th digit. Then the most significant digit of the digit range R2 is the (M−1)th digit, the least significant digit of the digit range R1 is the M-th digit, and the most significant digit of the digit range R1 is the (N+M−1)th digit. In HD Photo, the bit width M is adaptively variable.

Figure 8:
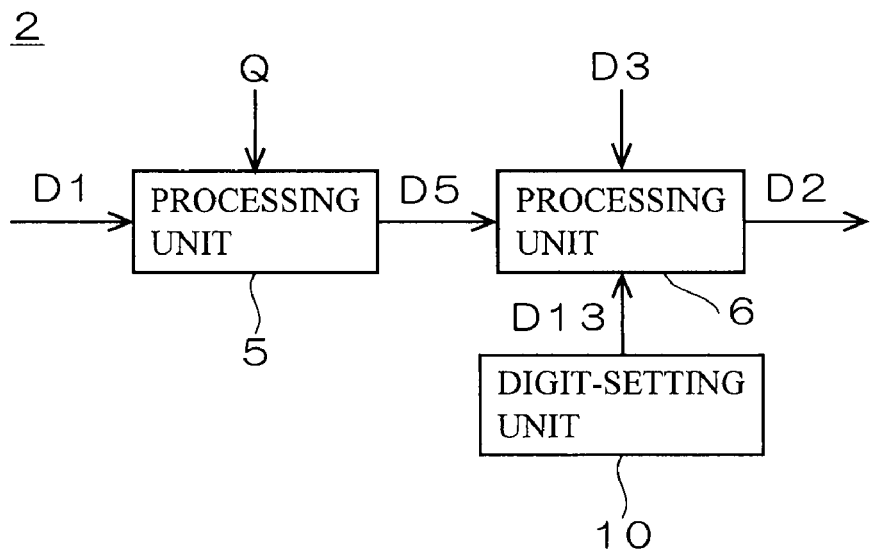
FIG. 8 is a block diagram showing a configuration of a quantization unit shown in FIG. 5.

FIG. 8 is a block diagram showing a configuration of the quantization unit 2 shown in FIG. 5. The quantization unit 2 includes processing units 5 and 6 and a digit-setting unit 10. The data D1 is inputted to the processing unit 5. The processing unit 5 divides the data D1 by a quantization coefficient Q, so as to output data D5 including a fraction as a result of division. The data D5 is inputted from the processing unit 5 to the processing unit 6. Meanwhile, the prediction data D3 has been inputted to the processing unit 6. The processing unit 6 compares the data D5 with the data D3, and based on the comparison, rounds up or rounds off the fraction of the data D5 such that the value of the data D4 becomes smaller, so as to output the data D2. One can variably set a digit range in the data D5 to be handled as a fraction, by data D13 inputted from the digit-setting unit 10 to the processing unit 6.

Figure 9:
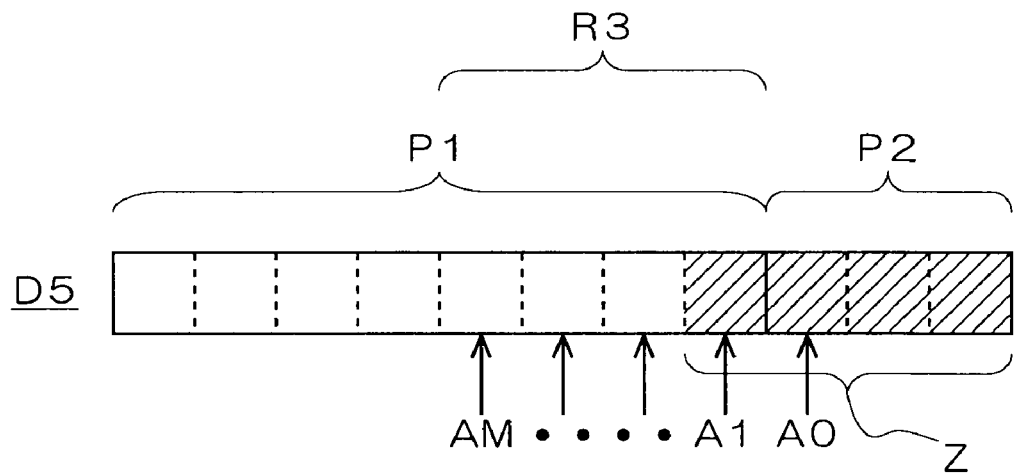
FIG. 9 shows data.

FIG. 9 shows the data D5. The data D5 includes an integer part P1 and a fractional part P2. The digit range R3 on the lower side in the integer part P1 is equivalent to the digit range R2 (Flex Bit) shown in FIG. 7. Let the most significant digit of the fractional part P2 be the digit A0th. Then the least significant digit of the digit range R3 is the digit A1, and the most significant digit of the digit range R3 is the digit AM. The digit-setting unit 10 select one digit from the digits A0 to AM to be inputted to the processing unit 6 as data D13. When the digit A1 is selected, for example, the range of the digit A1 and the lower digits (the range indicated by oblique lines) is set as a fraction in the data D5.

FIGS. 10A to 10F illustrate a first example of processing of the processing units 5 and 6 and the digit-setting unit 10 shown in FIG. 8. In FIGS. 10A to 10F, it is assumed that the bit width of the data D1 is 8 bits and the value of the quantization coefficient Q is "8", by way of example.

Figure 10A:
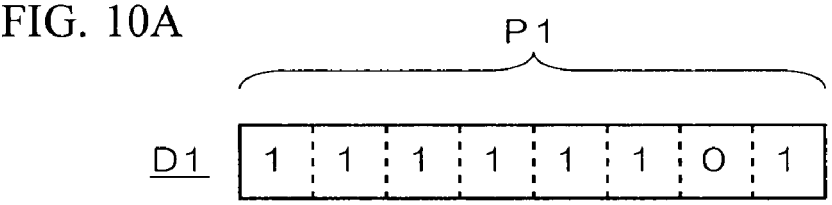
FIGS. 10A to 10F illustrate a first example of processing of processing units and a digit-setting unit shown in FIG. 8.

As shown in FIG. 10A, the data D1 having a value, for example, "11111101" is inputted to the processing unit 5.

Figure 10B:
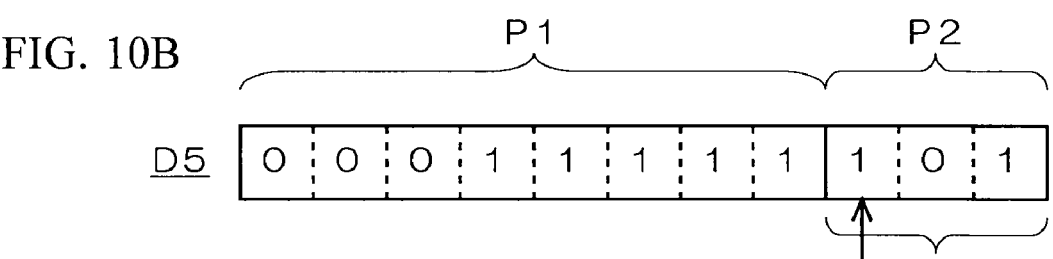

The processing unit 5 divides the data D1 by "8", so as to output the data D5 including a fraction as a result of division. Specifically, as shown in FIG. 10B, the data D1 is shifted 3 bit positions to the right, and the data D5 including the integer part P1 having a value "00011111" and the fractional part P2 having a value "101" is outputted. The data D5 is inputted to the processing unit 6. Here, the data D13 specifying the digit A0 has been inputted from the digit-setting unit 10 to the processing unit 6, and accordingly, the fractional part P2 has been set as a fraction Z in the data D5.

The prediction data D3 has been inputted to the processing unit 6.

Figure 10C:
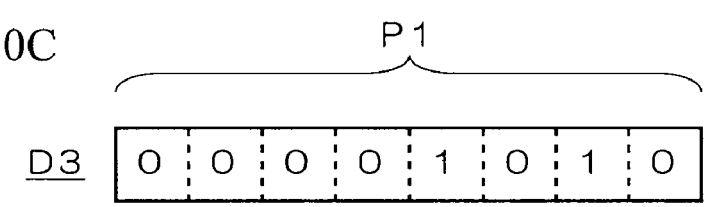
Figure 10D:
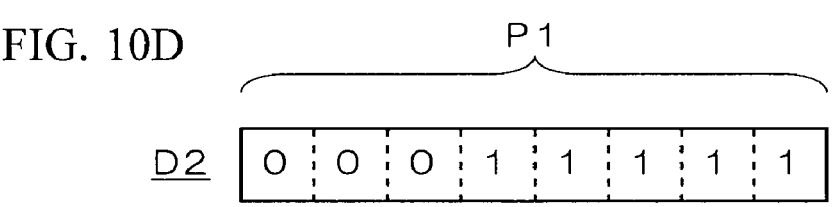

Here, it is assumed as a first case that the prediction data D3 having a value, for example, "00001010" has been inputted to the processing unit 6, as shown in FIG. 10C. The processing unit 6 compares the data D5 with the data D3. In this first case, the data D5 is larger than the data D3. In such a case, the processing unit 6 outputs the data D2 having a value "00011111" obtained by rounding off the fraction Z of the data D5, as shown in FIG. 10D. When the data D5 is larger than the data D3, the value of the data D2 approaches the value of the data D3 by rounding off the fraction Z of the data D5. Consequently, referring to FIG. 5, since the data D4, which is a difference value between the data D2 and D3, becomes smaller, and referring to FIG. 6, since the partial data D4U to be encoded by the processing unit 8 also becomes smaller, an amount of code of the coded data D11 is reduced.

Figure 10E:
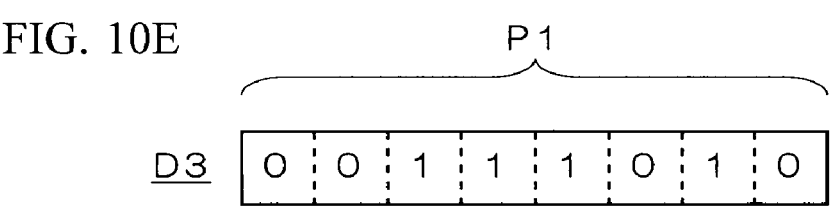
Figure 10F:
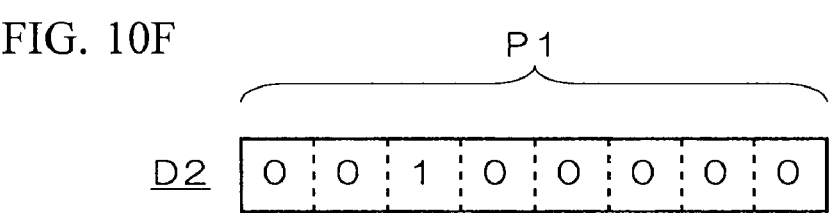

In contrast, it is assumed as a second case that the prediction data D3 having a value, for example, "00111010" has been inputted to the processing unit 6, as shown in FIG. 10E. The processing unit 6 compares the data D5 with the data D3. In this second case, the data D5 is smaller than the data D3. In such a case, the processing unit 6 outputs the data D2 having a value "00100000" obtained by rounding up the fraction Z of the data D5, as shown in FIG. 10F. When the data D5 is smaller than the data D3, the value of the data D2 approaches the value of the data D3 by rounding up the fraction Z of the data D5. Consequently, referring to FIG. 5, since the data D4, which is a difference value between the data D2 and D3, becomes smaller, and referring to FIG. 6, since the partial data D4U to be encoded by the processing unit 8 also becomes smaller, an amount of code of the coded data D11 is reduced.

FIGS. 11A to 11F illustrate a second example of processing of the processing units 5 and 6 and the digit-setting unit 10 shown in FIG. 8. In FIGS. 11A to 11F, it is assumed that the bit width of the data D1 is 8 bits and the value of the quantization coefficient Q is "8", by way of example.

Figure 11A:
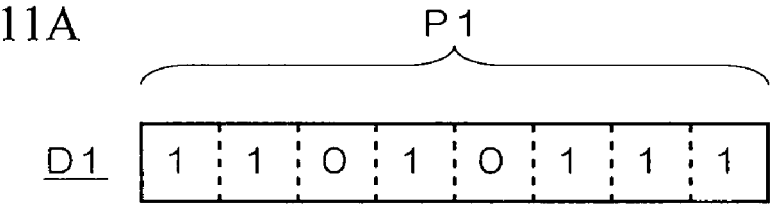
FIGS. 11A to 11F illustrate a second example of processing of processing units and a digit-setting unit shown in FIG. 8.
Figure 11B:
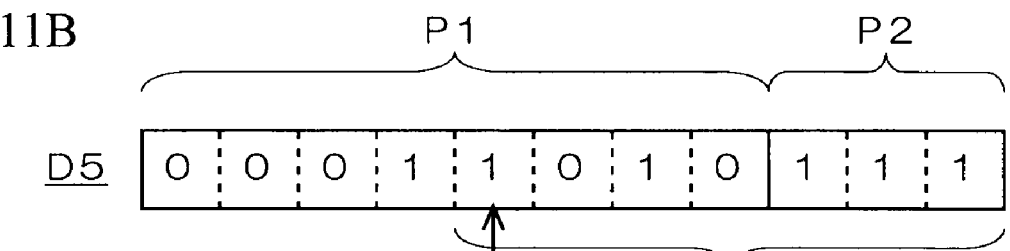

As shown in FIG. 11A, the data D1 having a value, for example, "11010111" is inputted to the processing unit 5.

The processing unit 5 divides the data D1 by "8", so as to output the data D5 including a fraction as a result of division. Specifically, as shown in FIG. 1B, the data D1 is shifted 3 bit positions to the right, and the data D5 including the integer part P1 having a value "00011010" and the fractional part P2 having a value "111" is outputted. The data D5 is inputted to the processing unit 6. Here, the data D13 specifying the digit AM has been inputted from the digit-setting unit 10 to the processing unit 6, and accordingly, the fractional part P2 and the lower 4 bits of the integer part P1 have been set as a fraction Z in the data D5.

The prediction data D3 has been inputted to the processing unit 6.

Figure 11C:
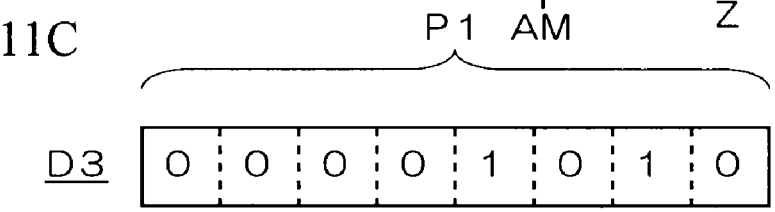
Figure 11D:
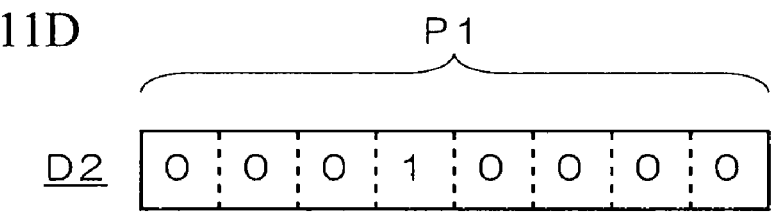

Here, it is assumed as a first case that the prediction data D3 having a value, for example, "00001010" has been inputted to the processing unit 6, as shown in FIG. 11C. The processing unit 6 compares the data D5 with the data D3. In this first case, the data D5 is larger than the data D3. In such a case, the processing unit 6 outputs the data D2 having a value "00010000" obtained by rounding off the fraction Z of the data D5, as shown in FIG. 11D. When the data D5 is larger than the data D3, the value of the data D2 approaches the value of the data D3 by rounding off the fraction Z of the data D5. Consequently, referring to FIG. 5, since the data D4, which is a difference value between the data D2 and D3, becomes smaller, and referring to FIG. 6, since the partial data D4U to be encoded by the processing unit 8 also becomes smaller, an amount of code of the coded data D11 is reduced.

Figure 11E:
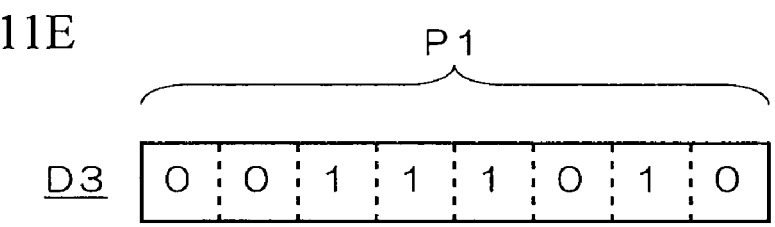
Figure 11F:
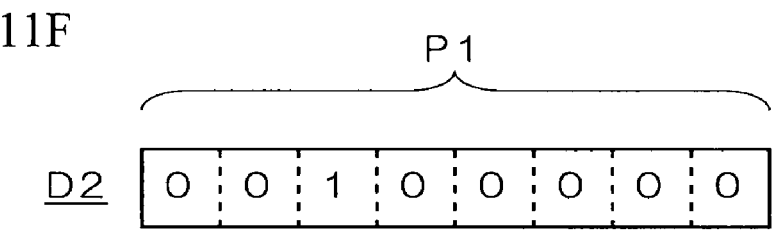

In contrast, it is assumed as a second case that the prediction data D3 having a value, for example, "00111010" has been inputted to the processing unit 6, as shown in FIG. 11E. The processing unit 6 compares the data D5 with the data D3. In this second case, the data D5 is smaller than the data D3. In such a case, the processing unit 6 outputs the data D2 having a value "00100000" obtained by rounding up the fraction Z of the data D5, as shown in FIG. 11F. When the data D5 is smaller than the data D3, the value of the data D2 approaches the value of the data D3 by rounding up the fraction Z of the data D5. Consequently, referring to FIG. 5, since the data D4, which is a difference value between the data D2 and D3, becomes smaller, and referring to FIG. 6, since the partial data D4U to be encoded by the processing unit 8 also becomes smaller, an amount of code of the coded data D11 is reduced.

As described above, according to the image processor 1B of the second preferred embodiment, since the value of the partial data D4U to be encoded by the processing unit 8 becomes smaller, reduction of an amount of code of the coded data D11 is achieved. Furthermore, only the partial data D4U on the upper side is encoded, rather than the whole data D4, and effect of reduction of an amount of code is achieved by encoding this partial data D4U on the upper side. Thus effect of reduction of an amount of code is more prominent than when the whole data D4 is encoded.

Moreover, according to the image processor 1B of the second preferred embodiment, one can set a specific digit for defining the fraction of the data D5 at an arbitrary digit within the range of the most significant and lower digits A0 to AM in the digit range R3, as shown in FIG. 9. Setting the specific digit at an upper side enhances the effect of reduction of an amount of code, while setting at a lower side improves image quality. This allows setting in accordance with preferences of a user.

Figure 12:
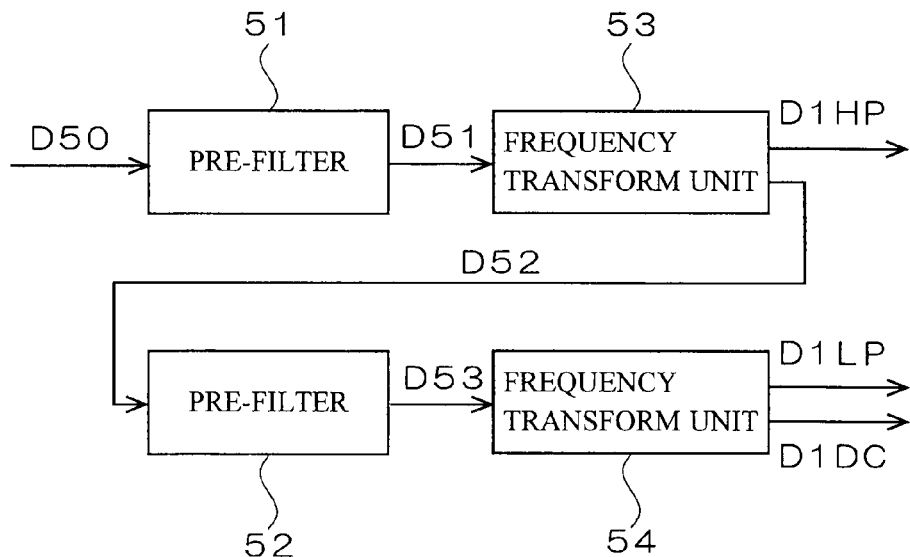
FIG. 12 is a block diagram showing a configuration of pre-filters and frequency transform units in an encoder for HD Photo.
Figure 13:
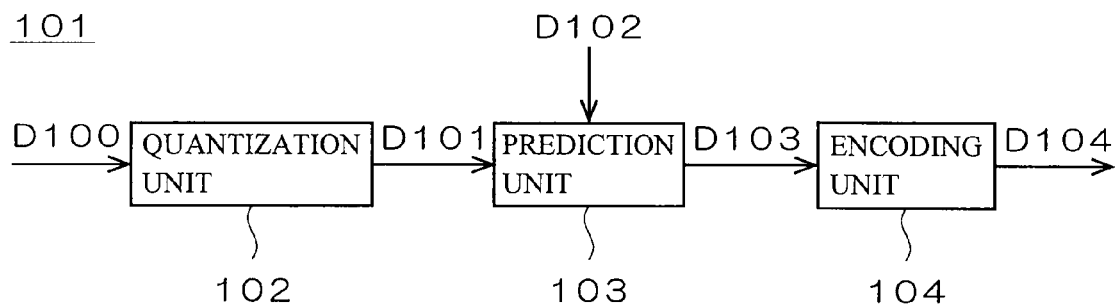
FIG. 13 is a block diagram showing a configuration of an encoder in a predictive coding system.
Figure 14:
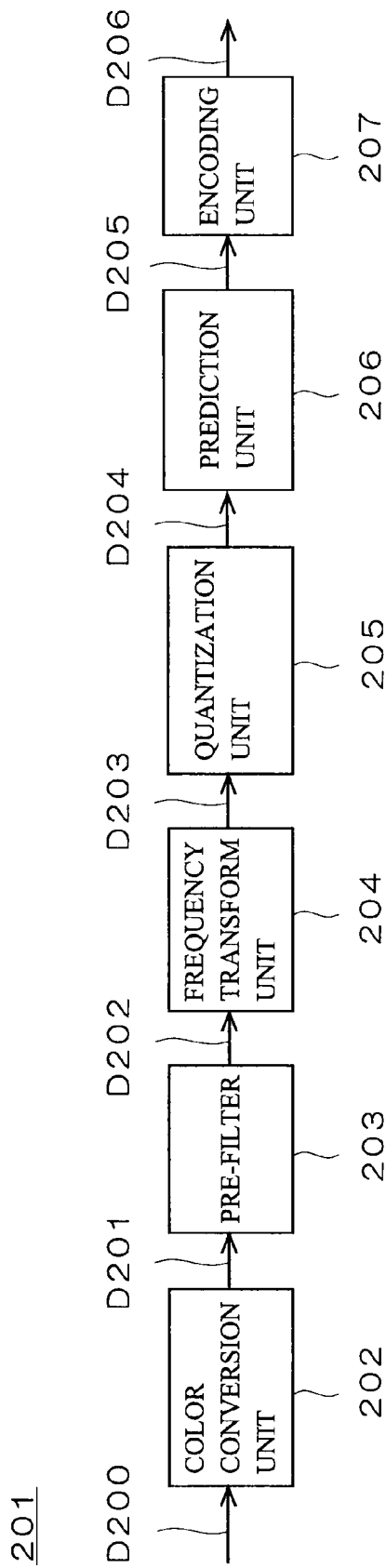
FIG. 14 is a block diagram showing a configuration of an encoder for HD Photo.

FIG. 12 is a block diagram showing a configuration of pre-filters 51 and 52 and frequency transform units 53 and 54 in an encoder for HD Photo. As shown in FIG. 12, the encoder for HD Photo includes the pre-filter 51 and the frequency transform unit 53 of a first stage, and the pre-filter 52 and the frequency transform unit 54 of a second stage.

A pixel signal D50 is inputted to the pre-filter 51. The pre-filter 51 performs prefiltering on the pixel signal D50 and outputs a pixel signal D51 after prefiltering. The pixel signal D51 is inputted to the frequency transform unit 53. The frequency transform unit 53 performs frequency transform (PCT) on the pixel signal D51, and outputs data D1HP of highpass component and data D52 of direct current component in the first stage. The data D52 is inputted to the pre-filter 52. The pre-filter 52 performs prefiltering on the data D52 and outputs data D53 after prefiltering. The data D53 is inputted to the frequency transform unit 54. The frequency transform unit 54 performs frequency transform (PCT) on the data D53, and outputs data D1LP of lowpass component and data D1DC of direct current component.

The data D1HP, D1LP, and D1DC outputted from the frequency transform units 53 and 54 are inputted to the quantization unit 2 as the data D1 shown in FIG. 5. Similarly, the data D4 inputted to the encoding unit 4 includes data of highpass, lowpass, and direct current components.

The present invention according to the second preferred embodiment is applicable to any of the highpass, lowpass, and direct current components in HD Photo.

While the invention has been described in detail, the foregoing description is in all aspects illustrative and not restrictive. It is understood that numerous other modifications and variations can be devised without departing from the scope of the invention.

What is claimed is:

1. An image processor comprising:
   a quantization unit receiving first data before quantization and outputting second data after quantization;
   a prediction unit obtaining a difference value between the second data and third data being prediction data and outputting the difference value as fourth data; and
   an encoding unit encoding the fourth data,
   the quantization unit including:
   a first processing unit dividing the first data by a quantization coefficient, so as to obtain fifth data including a fraction as a result of division; and
   a second processing unit rounding up or rounding off the fraction such that a value of the fourth data becomes smaller based on comparison between the third data and the fifth data, so as to obtain the second data.

2. The image processor according to claim 1,
   the encoding unit including:
   a third processing unit splitting the fourth data into a first partial data in a first digit range on an upper side and a second partial data in a second digit range on a lower side; and a fourth processing unit encoding only the first partial data between the first and second partial data, wherein
the fraction is data of a specific digit and a lower digit in a third digit range equivalent to the second digit range in the fifth data.

3. The image processor according to claim 2, wherein
the specific digit is set arbitrarily within a range of the most significant and a lower digit in the third digit range.

4. The image processor according to claim 2, wherein the first digit range is a Normal Bit in HD Photo, and the second digit range is a Flex Bit in HD Photo.

5. The image processor according to claim 3, wherein the first digit range is a Normal Bit in HD Photo, and the second digit range is a Flex Bit in HD Photo.

* * * * *